(12) United States Patent
Huang

(10) Patent No.: US 9,058,551 B2
(45) Date of Patent: Jun. 16, 2015

(54) RFID TAG AND OPERATING METHOD THEREOF

(75) Inventor: Chih-Hua Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 521 days.

(21) Appl. No.: 12/623,554

(22) Filed: Nov. 23, 2009

(65) Prior Publication Data

US 2010/0182122 A1    Jul. 22, 2010

(30) Foreign Application Priority Data

Jan. 20, 2009    (TW) ................................ 98102070 A

(51) Int. Cl.
    G05B 19/00    (2006.01)
    G06K 19/073   (2006.01)
    G06K 19/077   (2006.01)

(52) U.S. Cl.
    CPC .... G06K 19/07363 (2013.01); G06K 19/07749 (2013.01)

(58) Field of Classification Search
    CPC ................... G06K 19/07363; G06K 19/07749
    USPC ....................... 340/5.54, 5.8–5.86, 10.1, 10.4; 235/375–385; 455/41.1, 41.2
    See application file for complete search history.

(56) References Cited

U.S. PATENT DOCUMENTS

| | | | |
|---|---|---|---|
| 8,228,175 B1 * | 7/2012 | Diorio et al. | 340/10.51 |
| 8,237,562 B1 * | 8/2012 | Picasso et al. | 340/572.1 |
| 2006/0145857 A1 * | 7/2006 | Ono | 340/572.3 |
| 2007/0177738 A1 * | 8/2007 | Diorio et al. | 380/270 |
| 2008/0059659 A1 * | 3/2008 | Moritani et al. | 710/8 |
| 2009/0021343 A1 * | 1/2009 | Sinha | 340/5.2 |
| 2009/0106563 A1 * | 4/2009 | Cherpantier | 713/194 |
| 2010/0023429 A1 * | 1/2010 | Bolander et al. | 705/28 |
| 2010/0026494 A1 * | 2/2010 | Lees | 340/572.1 |

* cited by examiner

Primary Examiner — Ojiako Nwugo
(74) Attorney, Agent, or Firm — Edell, Shapiro & Finnan, LLC

(57) ABSTRACT

A radio frequency identification (RFID) tag and a method for operating the RFID tag are provided. The method includes steps of receiving a read command, generating a mode parameter, selecting a simulation situation from a situation group according to the mode parameter, and selectively generating a response signal according to the simulation situation. The situation group includes a first situation and a second situation. The response signal includes virtual identification (ID) information or virtual content information stored in the RFID tag.

10 Claims, 10 Drawing Sheets

RFID TAG AND OPERATING METHOD THEREOF

CROSS REFERENCE TO RELATED PATENT APPLICATION

This patent application is based on Taiwan, R.O.C. patent application No. 98102070 filed on Jan. 20, 2009.

FIELD OF THE INVENTION

The present invention relates to radio frequency identification (RFID) technology, and more particularly, to an RFID tag and operating method thereof.

BACKGROUND OF THE INVENTION

RFID technology is a communication technology that uses a wireless signal to identify a specific target and read/write data. No physical or optical contact is needed between the specific target and a data reader implementing the RFID technology. Thus, as compared to bar-code devices, RFID devices are much more convenient to identify/read/write data.

Since RFID technology is widely employed in the fields of logistics management, public consumption, identification and smart homes and offices to provide greatly improved user convenience, many companies are increasingly investing in RFID research and design. Notably, in addition to the fact that the cost of RFID technology is not low enough to totally replace bar-code systems, RFID technology also has a problem of unsatisfactory data security. That is, an important issue in the RFID field is how to ensure that the data is not unintentionally revealed during the process of exchanging wireless signals.

As far as the EPC UHF (class 1 generation 2) C1G2 RFID standard is concerned, any RFID device compliant with the standard is capable of accessing any C1G2 compliant RFID tag. The RFID tag has an authentication mechanism such as setting a password in advance to prevent an unauthorized RFID device from accessing data stored in memory inside the RFID tag. However, when an unauthorized RFID device learns the existence of the authentication mechanism, the unauthorized RFID device may persistently try to break that authentication mechanism. Provided that time is sufficient, the authentication mechanism of the RFID may be "hacked" or compromised.

SUMMARY OF THE INVENTION

In order to solve the foregoing problem, an RFID tag having a self protection mechanism and operating method thereof is provided according to the present invention, thereby reducing a risk that the RFID tag is improperly or unlawfully acquired by other unauthorized RF readers.

According to an embodiment, the method for operating the RFID tag comprises steps of receiving a read command, generating a mode parameter, selecting a simulation situation from a situation group according to the mode parameter, and selectively generating a response signal according to the simulation situation. The situation group comprises a first situation and a second situation.

According to another embodiment, the RFID tag comprises a transmitting/receiving module and a processing module coupled to each other. The transmitting/receiving module receives a read command, and the processing module responds to the read command according to different response situations simulated by the read command.

In order to achieve the foregoing object, the processing module comprises a mode parameter generating unit, a selecting unit, a first simulation unit and a second simulation unit. The mode parameter generating unit coupled to the transmitting/receiving module receives the read command and generates a mode parameter according to the read command. The first simulation unit is for simulating a first situation and the second simulation unit is for simulating a second situation.

In addition, the selecting unit, coupled to the mode parameter generating unit, the transmitting/receiving module, the first simulation unit and the second simulation unit, selects the first simulation unit or the second simulation unit according to the mode parameter, so as to allow the RFID tag to simulate the first situation and the second situation.

The RFID tag and operating method according to the present invention is capable of providing virtual identity information or virtual content information to an unauthorized RFID device and simulating a real read situation to mislead the unauthorized RFID into believing that it has unlawfully acquired the real data, thereby reducing a risk that the RFID tag is unlawfully acquired by the unauthorized RFID device.

The advantages and spirit related to the present invention can be further understood via the following detailed description and drawings.

DETAILED DESCRIPTION OF THE PREFERRED EMBODIMENT

Figure 1:
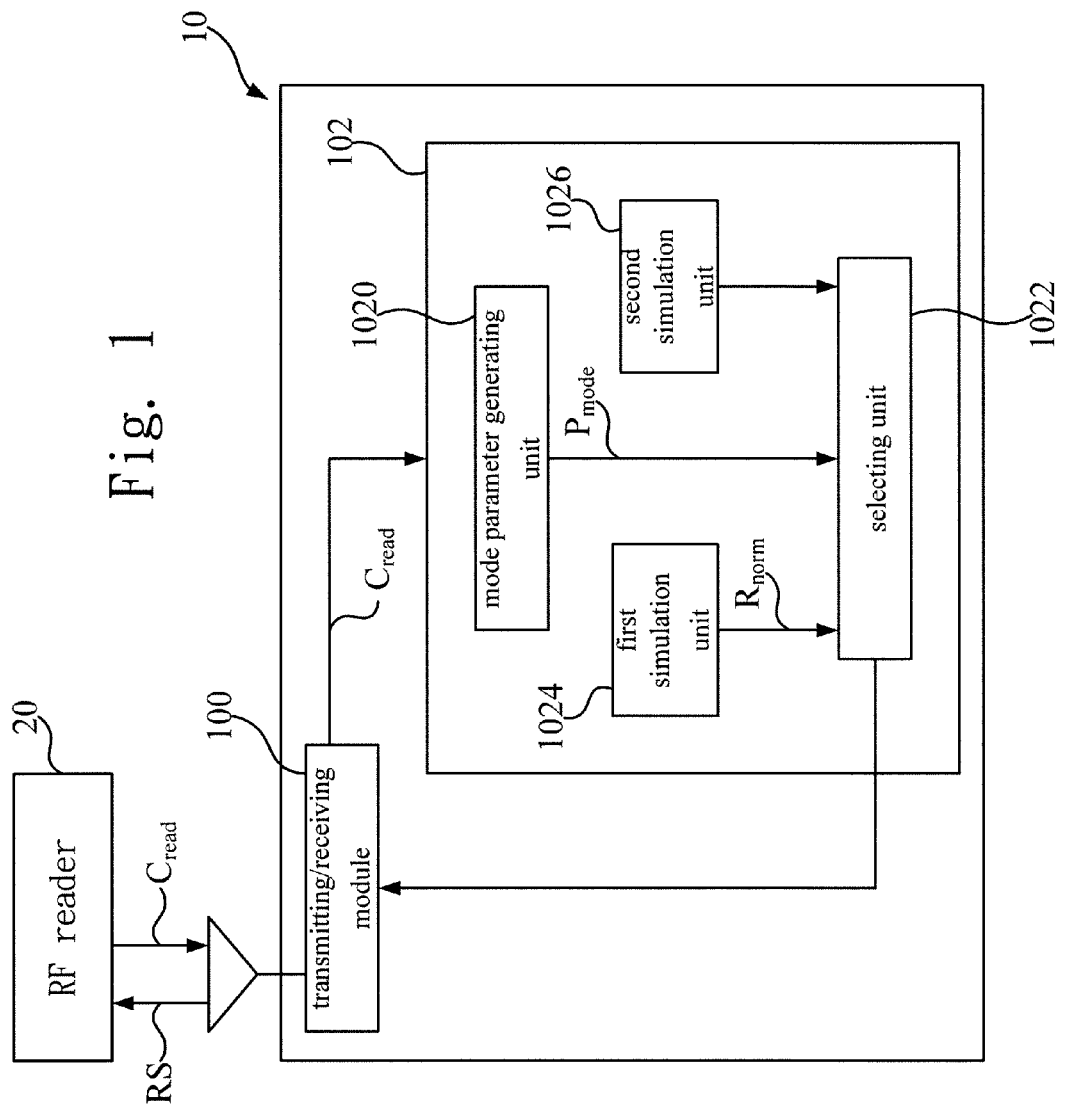
FIG. 1 is a functional block diagram of an RFID tag in accordance with an embodiment of the present invention.
Figure 2:
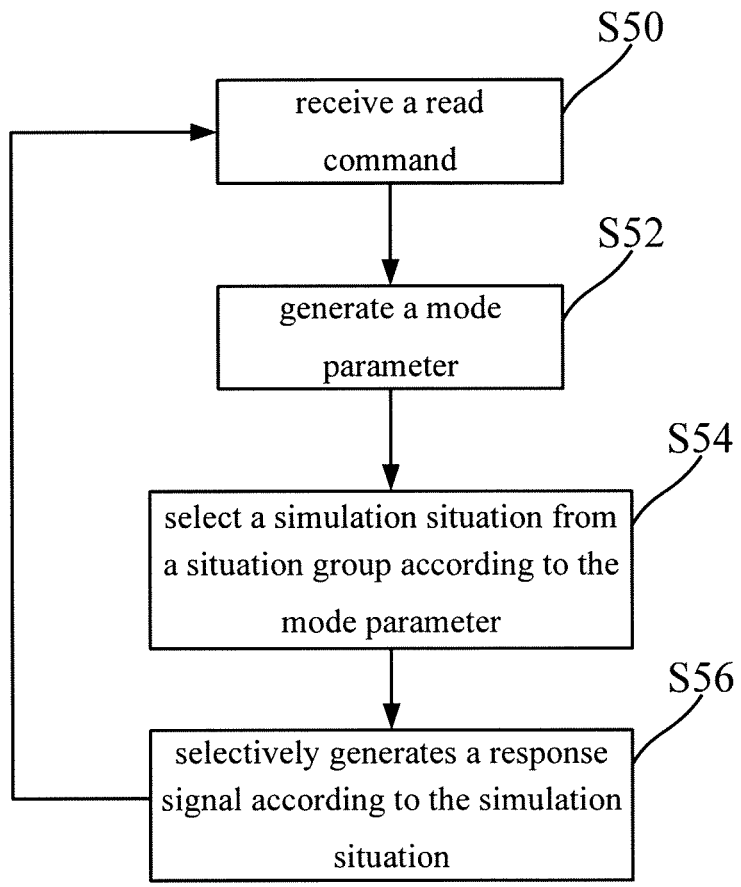
FIG. 2 is a flow chart of a method for operating an RFID tag in accordance with an embodiment of the present invention.

Referring to FIG. 1 and FIG. 2, FIG. 1 is a functional block diagram of an RFID tag in accordance with an embodiment of the present invention, and FIG. 2 a flow chart of a method for operating the RFID tag as illustrated in FIG. 1. An RFID tag 10 according to the present invention comprises a transmitting/receiving module 100, and a processing module 102 coupled to the transmitting/receiving module 100. The processing module 102 further comprises a mode parameter generating unit 1020, a selecting unit 1022, a first simulation unit 1024 and a second simulation unit 1026.

In Step S50, the transmitting/receiving module 100 receives a read command $C_{read}$ from an RF reader 20, which can be either authorized or unauthorized. In Step S52, the mode parameter generating unit 1020 receives the read command $C_{read}$ from the transmitting/receiving module 100 and generates a mode parameter $P_{mode}$ according to the read command $C_{read}$. In a practical application, the mode parameter generating unit 1020 may randomly generate the mode parameter $P_{mode}$.

The first simulation unit 1024 simulates a first situation, and the second simulation unit 1026 simulates a second situation. In this embodiment, the first simulation unit 1024 generates a legal response signal $R_{norm}$ comprising virtual identity information and virtual content information stored in the RFID tag 10. For example, the virtual identity information is identity information different from real identity information of the RFID tag, and the virtual content information is content information different from real content information. In addition, in this embodiment, the second situation is that the RFID tag does not generate any response signal.

In Step S54, the selecting unit 1022, coupled to the mode parameter generating unit 1020, the transmitting/receiving module 100, the first simulation unit 1024 and the second simulation unit 1026, selects a simulation situation from a situation group according to the mode parameter $P_{mode}$. The situation group comprises the foregoing first situation that the RFID tag 10 generates the normal response signal and the second situation that the RFID tag 10 does not generate any response signal. In practice, the situation group may further comprise other different situations.

In Step S56, according to the simulation situation, the RFID tag 10 selectively generates a response signal RS to the RF reader 20. Furthermore, when selecting the first situation, the selecting unit 1022 selects the first simulation unit 1024 and transmits the normal response signal $R_{norm}$ to the RF reader 20 via the transmitting/receiving module 100. In other words, the response signal RS is associated with the normal response signal $R_{norm}$. Accordingly, identity information, associated with the RFID tag 10, received by the RF reader 20, such as an identification code or other codes, is the virtual identity information rather than the real identification information. Content information received by the RF reader 20 is the virtual content information rather than the real content information.

In addition, when selecting the second situation, the selecting unit 1022 selects the second simulation unit 1026. The second simulation unit 1026 does not generate any response signal such that the RFID tag 10 does not generate the response signal RS to the RF reader 20 either.

Figure 3:
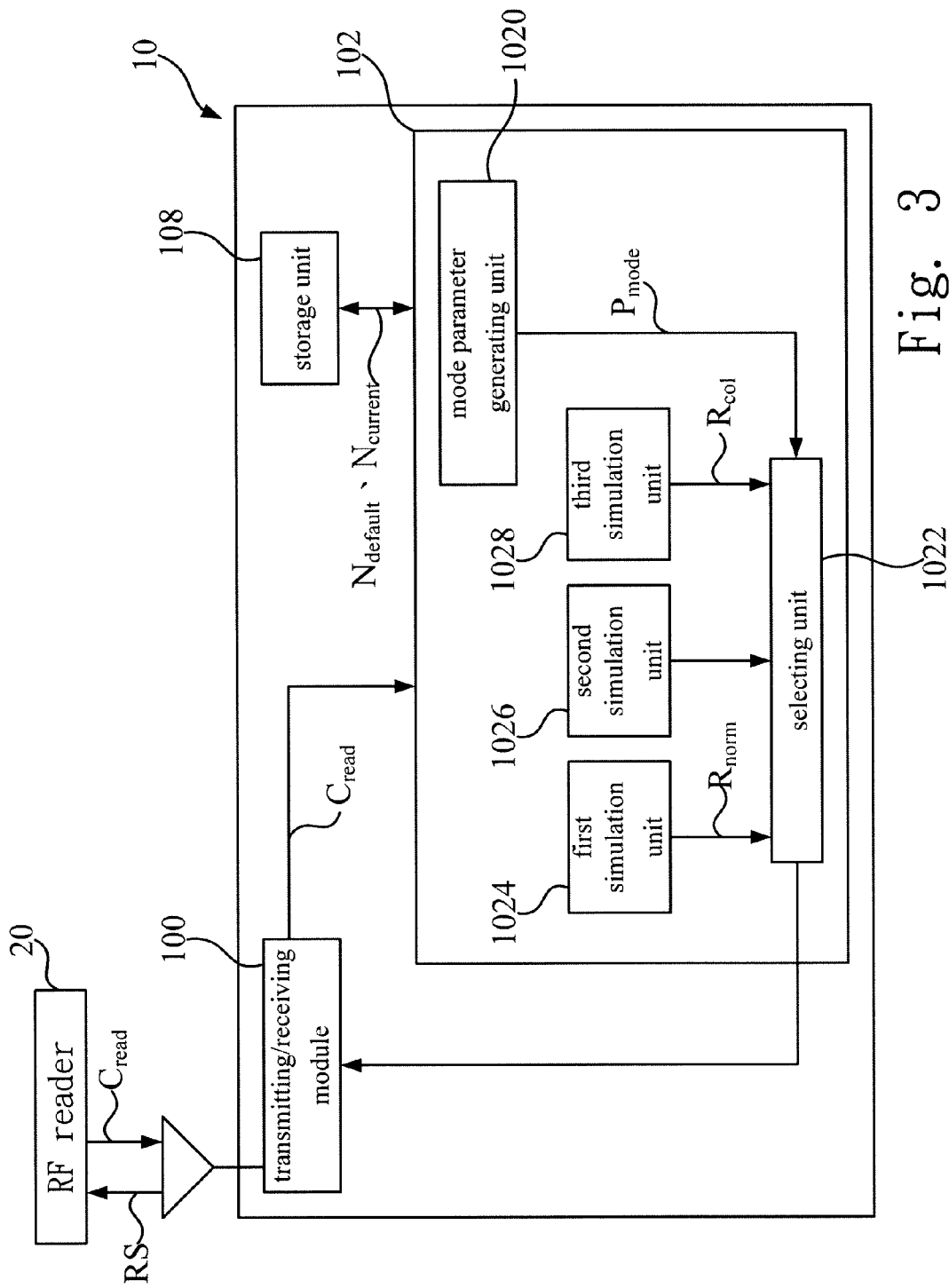
FIG. 3 is a functional block diagram of another RFID tag in accordance with another embodiment of the present invention.
Figure 4:
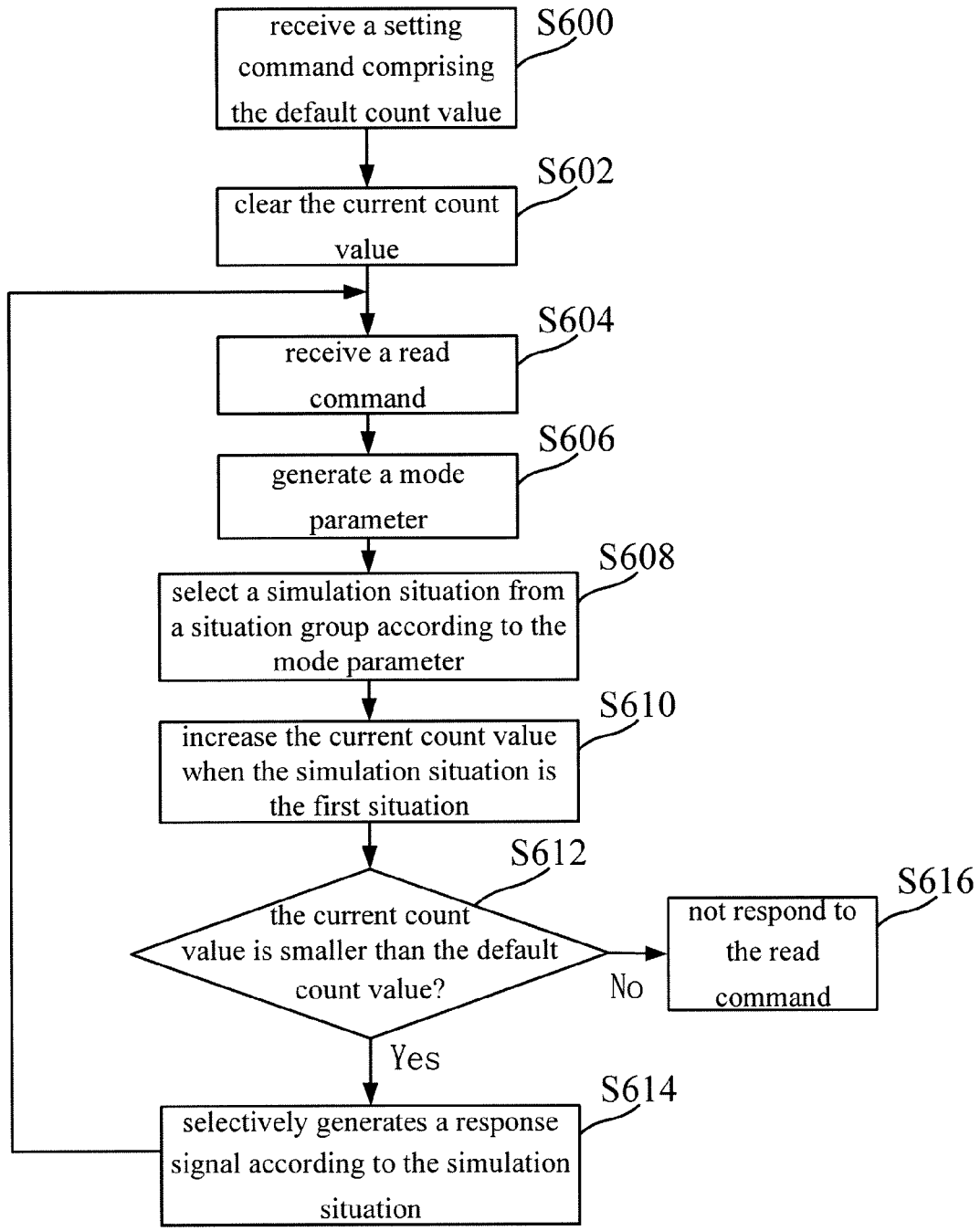
FIG. 4 is a flow chart of a method for operating the RFID tag illustrated in FIG. 3.

Referring to FIG. 3 and FIG. 4, FIG. 3 is a functional block diagram of an RFID tag in accordance with an embodiment of the present invention, and FIG. 4 a flow chart of a method for operating the RFID tag illustrated in FIG. 3. In this embodiment, the RFID tag 10 further comprises a storage unit 108, and the processing module 102 further comprises a third simulation unit 1028.

The third simulation unit 1028, coupled to a selecting unit 1022, simulates a third situation. In this embodiment, the third situation is that the RFID tag 10 generates a collision signal $R_{col}$ for simulating a signal collision. In other words, the third simulation unit 1028 can generate the collision signal $R_{col}$. Therefore, in this embodiment, the selecting unit 1022 selects a first simulation 1024, a second simulation unit 1026 or the third simulation unit 1028 according to the mode parameter, so as to allow the RFID tag 10 to simulate the first situation, the second situation or the third situation.

In a practical application, the RFID tag 10 according to the present invention further comprises at least one of the foregoing three simulation units, so as to simulate a corresponding situation. In practice, the RFID tag 10 according to the present invention may further comprise other simulation units to simulate corresponding situations.

The storage unit 108, coupled to the processing module 102, stores, or is programmed with, a default count value $N_{default}$ and a current count value $N_{current}$. For example, the default count value $N_{default}$ is set in the RFID tag in advance or Step S600 is performed. In Step S600, before receiving the read command $C_{read}$, the RFID tag 10 receives a setting command $C_{set}$ comprising the default count value $N_{default}$. The setting command $C_{set}$ is transmitted to the RFID tag via an authorized RF reader.

In Step S602, the processing module 102 clears the current count value stored in the storage unit 108. In Step S604, the transmitting/receiving module 100 of the RFID tag 10 receives the read command $C_{read}$. In Step S606, the mode parameter generating unit 1020 of the processing module 102 generates a mode parameter according to the read command.

In Step S608, the selecting unit 1022 selects the first simulation unit 1024, the second simulation unit 1026 or the third simulation unit 1028, so as to select the first situation, the second situation or the third situation as a simulation situation. In Step S610, when the selecting unit 1022 selects the first simulation unit 1024 for simulating the first situation of responding to the normal response signal $R_{norm}$, the processing module 102 increases the current count value. For example, the current count value increments by a fixed value such as 1. Furthermore, in Step S612, the processing module 102 determines whether the current count value $N_{current}$ is smaller than the default count value $N_{default}$.

In Step S614, when the current count value $N_{current}$ is smaller than the default count value $N_{default}$, the RFID tag 10 selectively generates a response signal according to the simulation situation selected in Step S608. When the current count value $N_{current}$ is not smaller than the default count value $N_{default}$, Step S616 is performed. In Step 616, the RFID tag 10 does not respond to the read command $C_{read}$. For example, the RFID tag 10 according to the present invention is designed as discussed below. When the current count value $N_{current}$ is not smaller than the default count value $N_{default}$, the selecting unit 1022 always selects the second simulation unit 1026 to prompt the RFID tag 10 to simulate the second situation.

Figure 5:
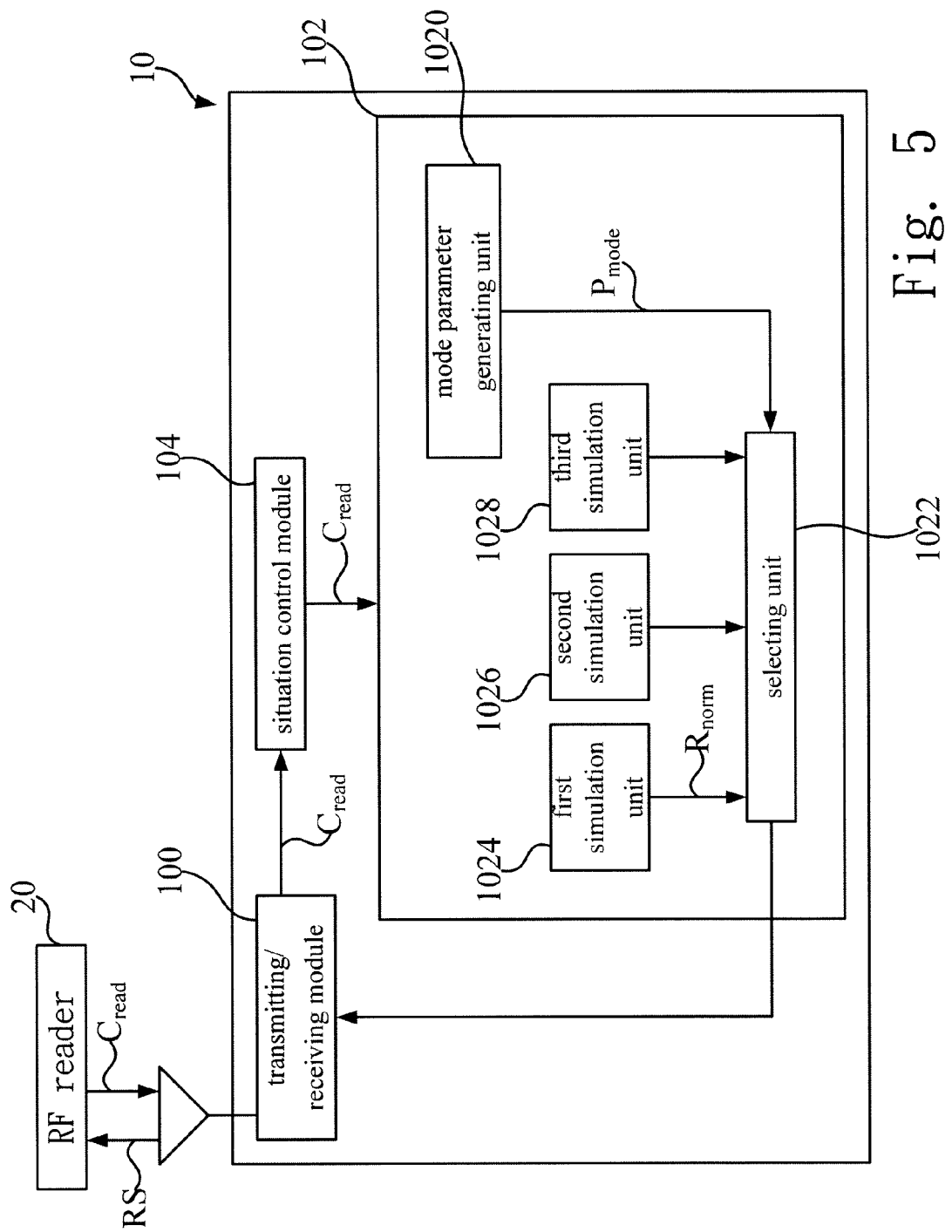
FIG. 5 is a functional block diagram of another RFID tag in accordance with another embodiment of the present invention.
Figure 6:
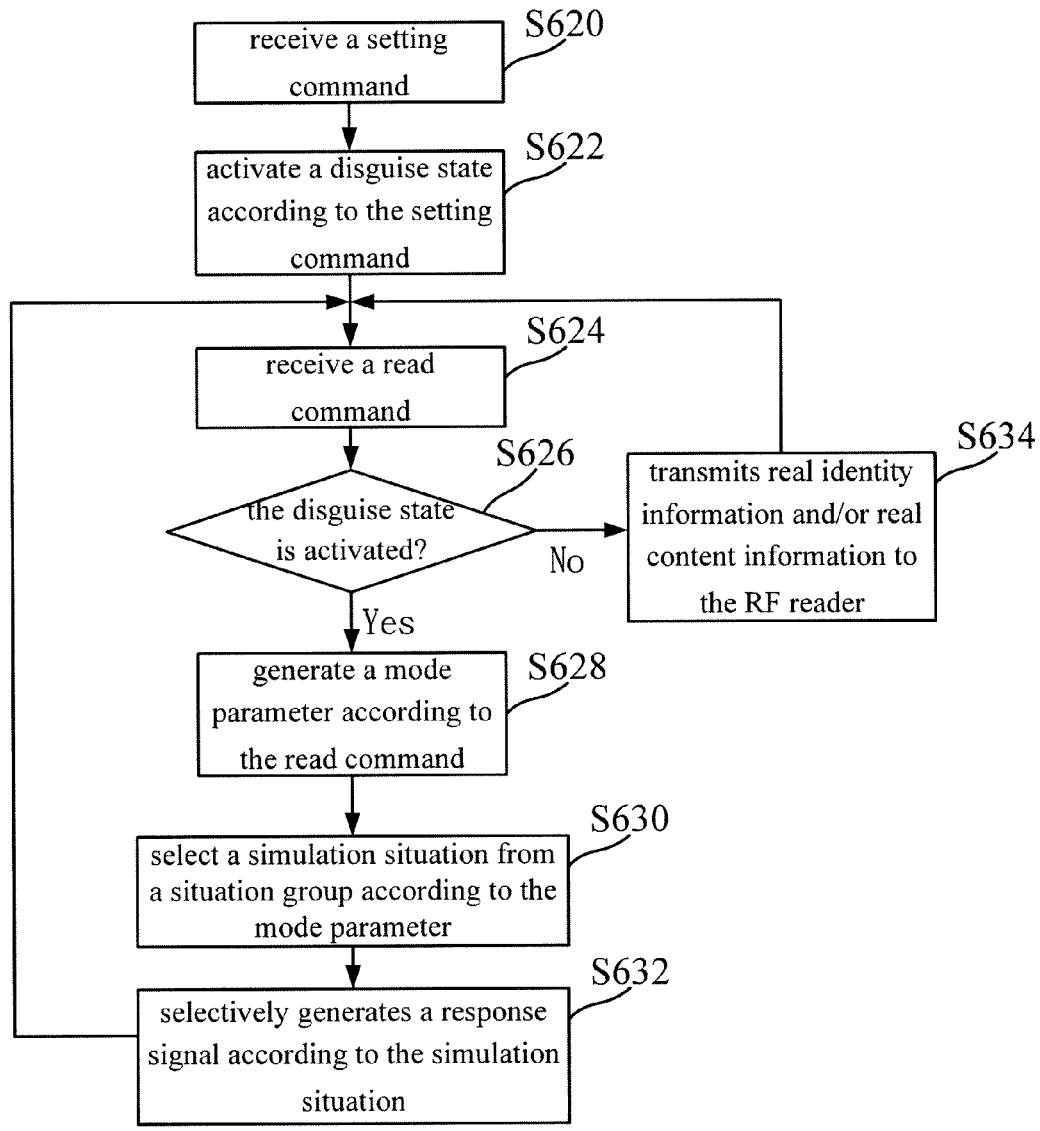
FIG. 6 is a flow chart of a method for operating the RFID tag as illustrated in FIG. 5.

Referring to FIG. 5 and FIG. 6, FIG. 5 is a function block diagram of an RFID tag in accordance with another embodiment of the present invention, and FIG. 6 is a flow chart of a method for operating the RFID tag illustrated in FIG. 5. The RFID tag 10 according to the embodiment further comprises a situation control module 104 coupled to the transmitting/receiving module 100 and the processing module 102.

In this embodiment, in Step S620, before the read command $C_{read}$ is received, the RFID tag 10 receives a setting command $C_{set}$. In Step S622, the situation control module 104 activates a disguise state. In Step S624, the RFID tag 10 receives the read command $C_{read}$. In Step S626, after the RFID tag 10 has received the read command $C_{read}$, the situation control module 104 determines whether the disguise state of the RFID tag 10 is activated.

In Step S628, when the answer of Step S626 is yes, the situation control module 104 controls the processing module 102 such that the mode parameter generating unit 1020 generates a mode parameter $P_{mode}$ according to the read command $C_{read}$. Step S630 is then performed. In Step S630, a simulation situation is selected from a situation group according to the mode parameter $P_{mode}$. In Step S632, a response signal RS is selectively generated according to the simulation situation. When the disguise state is not activated, Step S634 is performed. In Step S634, the RFID tag 10 transmits real identity information and/or real content information to the RF reader 20 via the response signal RS.

For example, the disguise state is defined by an authorized RF reader. Therefore, when the authorized RF reader wishes to access the real identity information and/or the real content information of the RFID tag 10, the disguise state of the RFID tag is deactivated. In addition, in a practical application, the setting command $C_{set}$ further comprises the foregoing default count value $N_{default}$.

Figure 7:
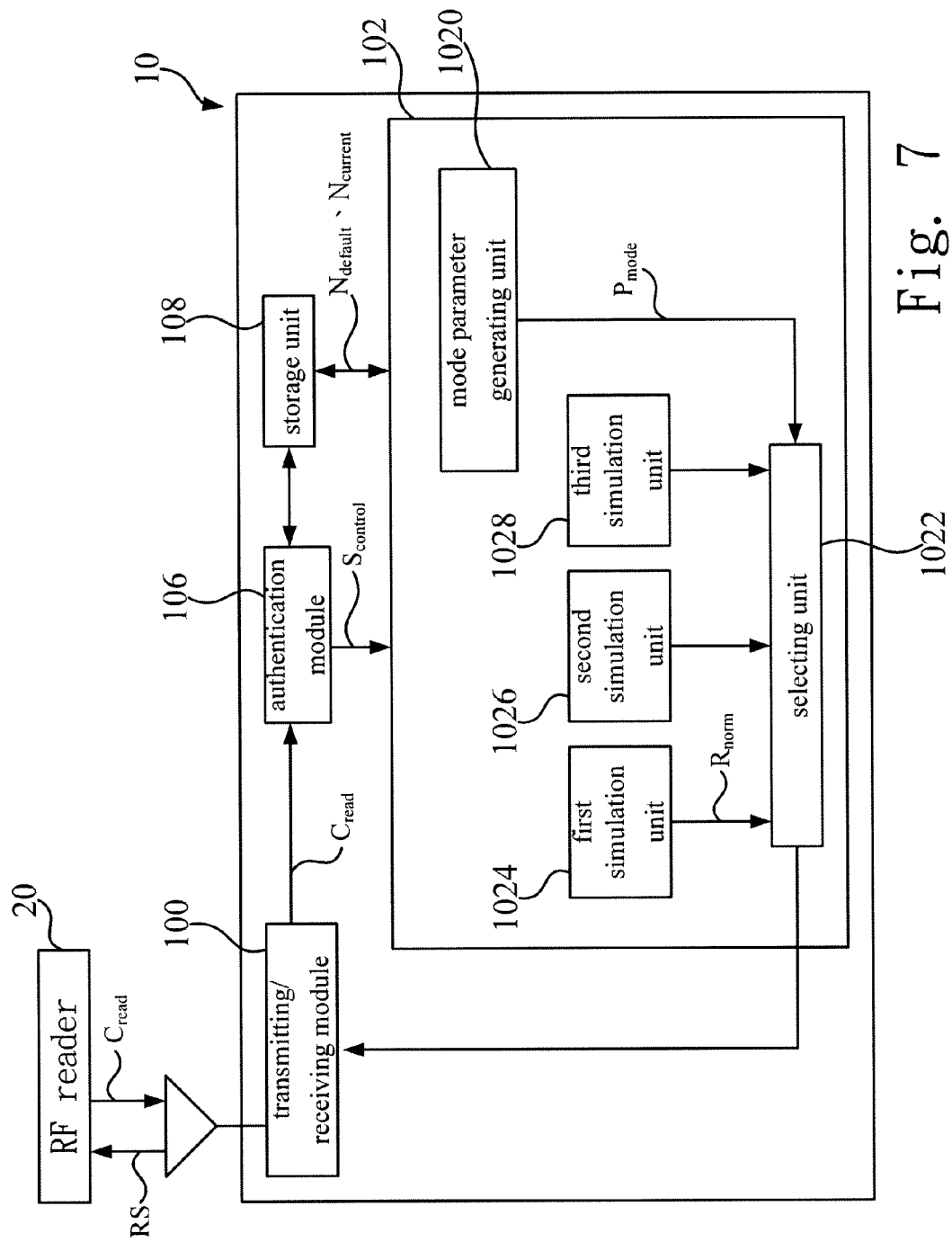
FIG. 7 is a functional block diagram of another RFID tag in accordance with an embodiment of the present invention.
Figure 8:
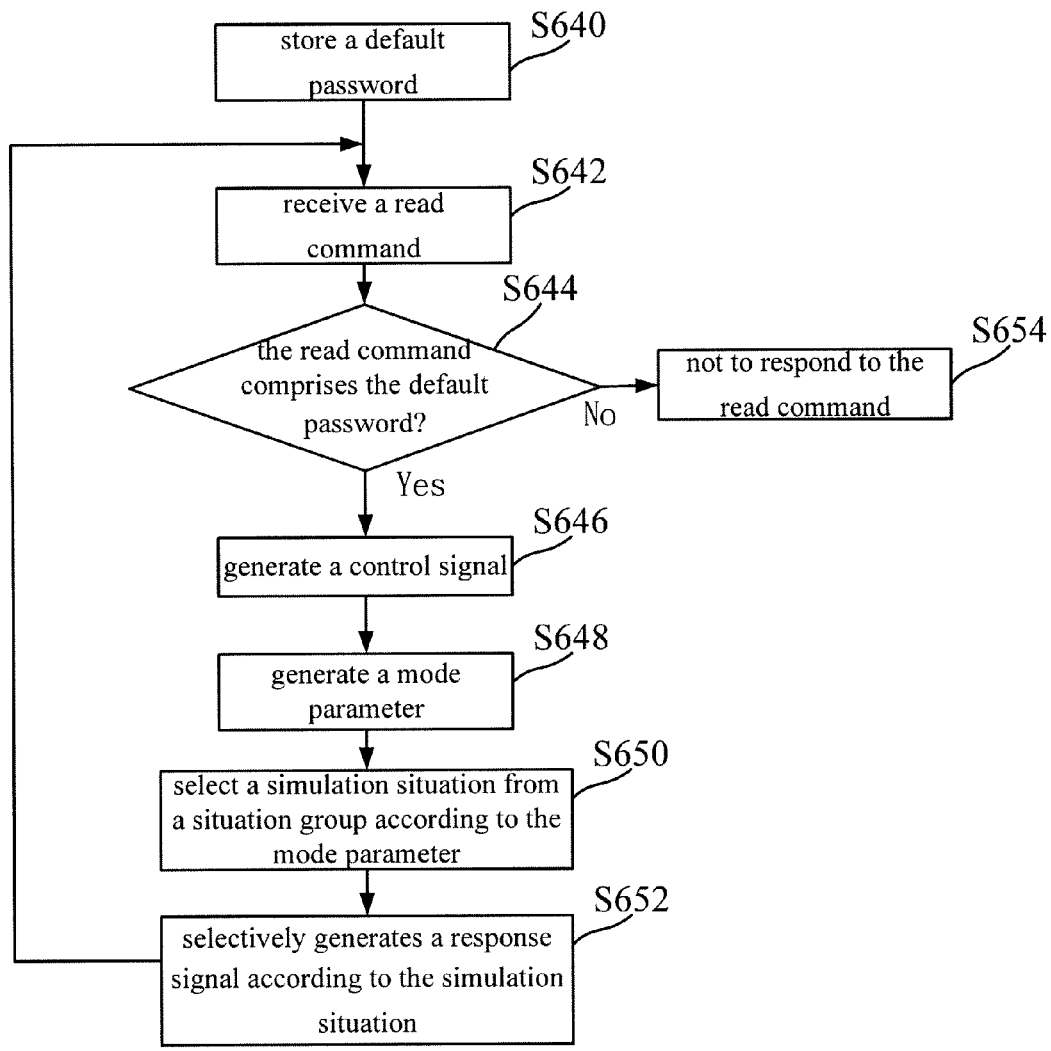
FIG. 8 is flow chart of a method for operating the RFID tag illustrated in FIG. 7.

Referring to FIG. 7 and FIG. 8, FIG. 7 is a function block diagram of an RFID tag in accordance with another embodiment of the present invention, and FIG. 8 a flow chart of an operating method of the RFID tag as illustrated in FIG. 7. The RFID tag 10 according to this embodiment further comprises a storage unit 108, and an authentication module 106 coupled to the storage unit 108, the processing module 102 and the transmitting/receiving module 100.

In this embodiment, in Step S640, the storage unit 108 stores a default password. In Step S642, the authentication module 106 receives a read command $C_{read}$ via the transmitting/receiving module 100. After Step S642, in Step S644, the authentication module 106 checks whether the read command $C_{read}$ comprises the default password. When the answer of Step S644 is yes, Step S646 is performed; otherwise, Step S654 is performed. In Step S646, the authentication module 106 generates a control signal $S_{control}$ to control the processing module 102 to perform Step S648. In Step S648, the processing module 102 generates a mode parameter. In Step S650, a simulation situation is selected from a situation group according to the mode parameter. In Step S652, a response signal is selectively generated according to the simulation situation. In Step S654, the authentication module 106 controls the RFID tag 10 not to respond to the read command. For example, the default password is provided or stored in the RFID tag in advance via the foregoing setting $C_{set}$, which is transmitted by the authorized RF reader.

The RFID tag according to the present invention is capable of providing a basic security mechanism with respect to information of the RFID tag by setting the default password. Particularly, when an unauthorized RF reader wishes to access the RFID tag according to the present invention, the mechanism induces the RF reader to, instead of realizing that the accessed information is in fact virtual information, believe that accessed information is real information after cracking the default password.

Figure 9:
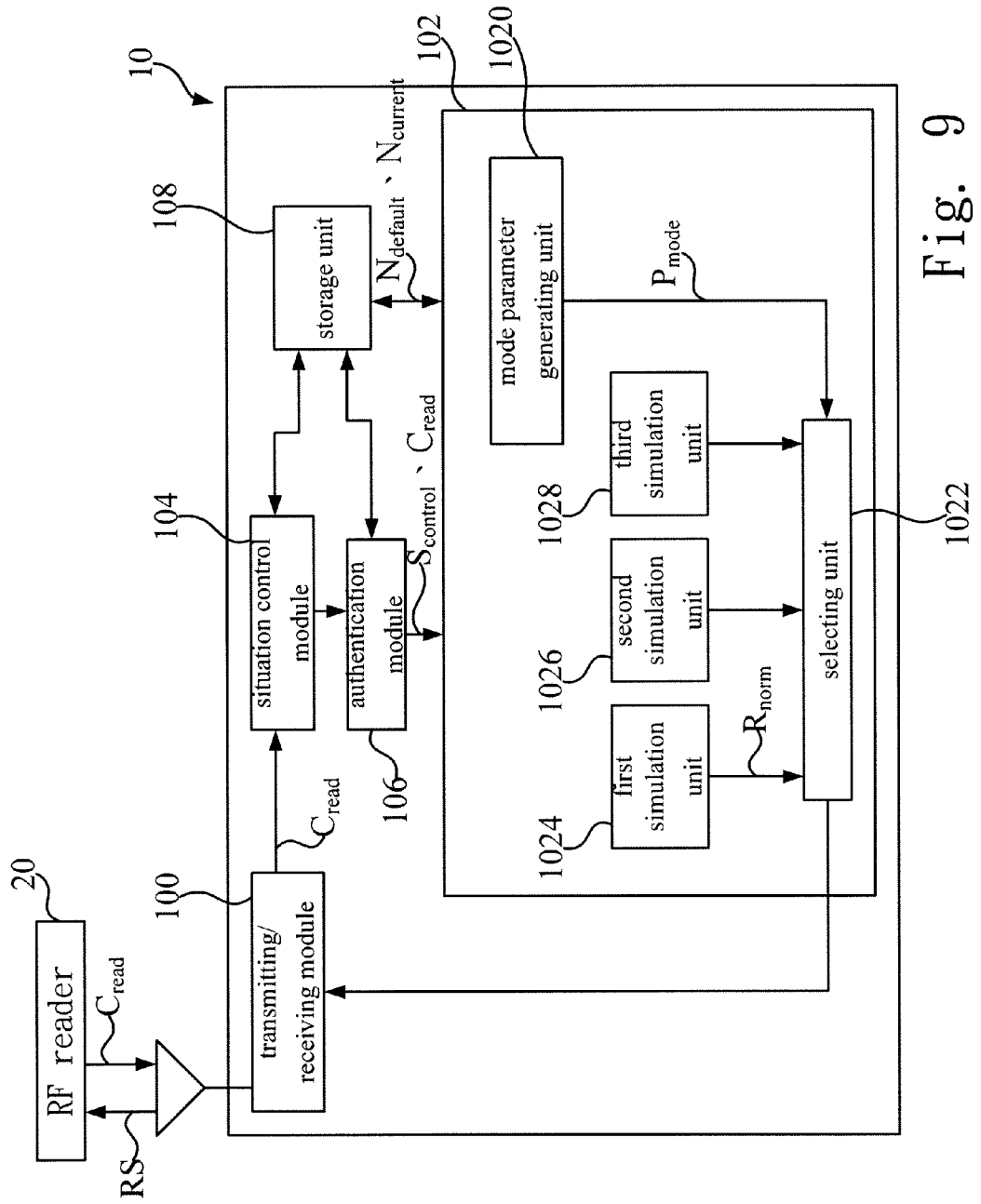
FIG. 9 is a functional block diagram of another RFID tag in accordance with an embodiment of the present invention.
Figure 10:
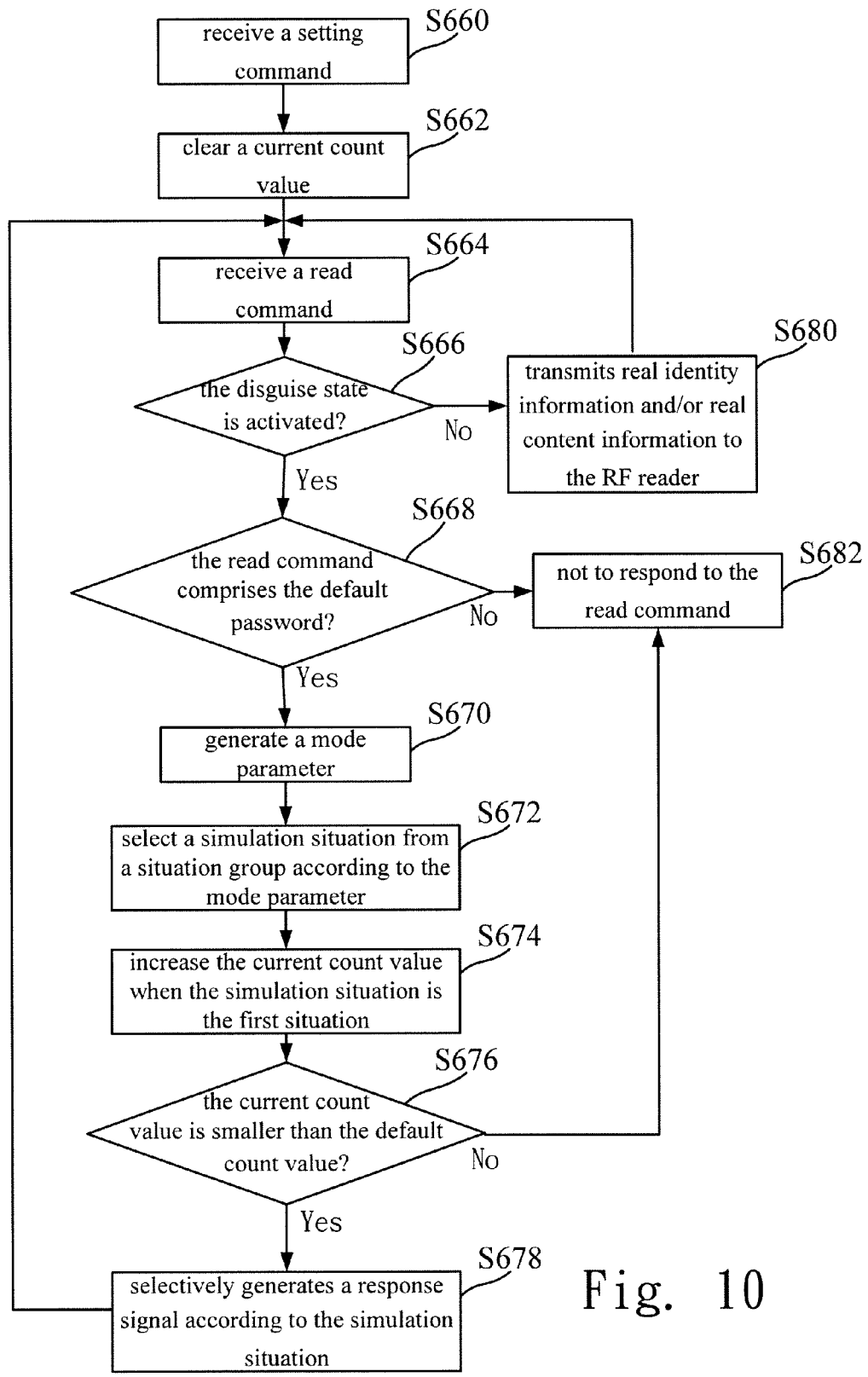
FIG. 10 is flow chart of an operating method of the RFID tag as illustrated in FIG. 9.

Referring to FIG. 9 and FIG. 10, FIG. 9 is a functional block diagram of an RFID tag in accordance with another embodiment of the present invention, and FIG. 10 is a flow chart of a method for operating the RFID tag illustrated in FIG. 9. In this embodiment, the RFID tag 10 according to the present invention further comprises the foregoing storage unit 108, the situation control module 104 and the authentication module 106. Connections between the units and the modules are similar to those shown in the foregoing figures. In addition, the method for operating the RFID tag comprises steps below.

In Step S660, a setting command from an authorized RF reader is received. The setting command comprises a default count value, a disguise state activating signal and/or a default password. In Step S662, a current count value is cleared.

In Step S664, the read command is received. In Step S666, it is determined whether the disguise state is activated. In Step S668, when the disguise state is activated, it is determined whether the read command comprises the default password. In Step S680, when the disguise state is not activated, real identity information and/or real content information are/is transmitted to the RF reader.

In Step S670, when the read command comprises the default password, a mode parameter is generated. In Step S682, when the read command does not comprise the default password, the read command is not responded to. After Step S670, in Step S672, a simulation situation is selected from a situation group according to the mode parameter. After Step S672, in Step S674, when the simulation situation is a first situation, a current count value is increased. In Step S676, it is determined whether the current count value is smaller than a predetermined count value. In Step S678, when the answer of Step S676 is yes, a response signal is selectively generated according to the simulation situation. When the answer of Step S676 is no, the read command is not responded to.

It is to be noted that, in a practical application, units and modules of an RFID tag according to the present invention are selected under conditions that the spirit of the present invention are not conflicted. Connections and operation procedures of the units and modules can be adjusted properly, and the invention is not limited in the foregoing embodiments. In addition, sequence and content of steps of the method for operating an RFID tag according to the present invention can be adjusted properly, and the invention is not limited in the foregoing embodiments.

An RFID tag and operating method according to the present invention is capable of providing virtual identity information or virtual content information to an unauthorized RFID device and simulating a real read situation to mislead the unauthorized RFID device into believing that it has unlawfully acquired the real data, thereby reducing a risk that the RFID tag is unlawfully acquired by the unauthorized RFID device.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for operating a radio frequency identification (RFID) tag, comprising:
   receiving a read command;
   determining whether a disguise state used to mislead an unauthorized RFID reader is activated based on the read command, and wherein activation of the disguise state is comprises:
   generating, by the RFID tag, a mode parameter, wherein the generating is performed randomly;
   selecting a simulation situation from a situation group according to the mode parameter, the situation group comprising a first situation, a second situation, and a third situation; and
   selectively generating a response signal according to the simulation situation, wherein the first situation is that the RFID tag generates a normal response signal serving as the response signal, and the normal response signal comprises virtual identity information or virtual content information stored in the RFID tag,
   wherein the second situation is that the RFID tag does not generate any response signal, and
   wherein the third situation is that the RFID tag generates a collision signal serving as the response signal to simulate a signal collision.

2. The method as claimed in claim 1, the RFID tag being programmed with a current count value, the method further comprising:
increasing the current count value when the simulation situation is the first situation.

3. The method as claimed in claim 2, the RFID tag being programmed with a default count value, the method further comprising:
comparing the current count value with the default count value; wherein the RFID tag does not respond to subsequent read commands when the current count value is not smaller than the default count value.

4. The method as claimed in claim 3, further comprising:
receiving a setting command that includes the default count value; and
storing the default count value in a memory of the RFID tag.

5. The method as claimed in claim 1, wherein the RFID tag is programmed with a default password, and the step of receiving the read command further comprises:
checking whether the read command comprises the default password;
wherein, the RFID tag performs the steps of generating the mode parameter, selecting the simulation situation from the situation group and selectively generating the response signal only when the read command comprises the default password.

6. An RFID tag, comprising:
a transceiving module, for receiving a read command; and
a processing module, coupled to the transceiving module and configured to determine whether a disguise state that is used to mislead an unauthorized RFID reader is activated based on the read command, the processing module comprising:
a mode parameter generating unit, for generating a mode parameter according to the read
command, wherein the mode parameter generating unit randomly generates the mode parameter;
a selecting unit, coupled to the mode parameter unit and the transceiving module;
a first simulation unit, coupled to the selecting unit, for simulating a first situation;
a second simulation unit, coupled to the selecting unit, for simulating a second situation;
and
a third simulation unit, coupled to the selecting unit, for simulating a third situation, wherein, the selecting unit selects the first simulation unit or the second simulation unit or the third simulation unit according to the mode parameter so that the RFID tag simulates the first situation or the second situation or the third situation,
wherein the first situation is that the RFID tag generates a normal response signal comprising virtual identity information or virtual content information stored in the RFID tag,
wherein the second situation is that the RFID tag does not generate any response signal,
and wherein the third situation is that the RFID tag generates a collision signal serving as the response signal to simulate a signal collision.

7. The RFID tag as claimed in claim 6, further comprising:
a storage unit, coupled to the processing module, for storing a current count value;
wherein, when the selecting unit selects the first simulation unit to simulate the first situation, the processing module increases the current count value.

8. The RFID tag as claimed in claim 7, wherein the storage unit further stores a default count value, the processing module compares the current count value with the default count value, and the RFID tag does not respond to subsequent read commands when the current count value is not smaller than the predetermined count value.

9. The RFID tag as claimed in claim 8, wherein the default count value is stored in the storage unit upon receipt by the RFID tag of a setting command.

10. The RFID tag as claimed in claim 6, further comprising:
a storage unit, for storing a default password; and
an authentication module, coupled to the storage unit, the processing module and the transceiving module, for checking whether the read command comprises the default password;
wherein, the authentication module generates a control signal to control the processing module to generate the mode parameter according to the read command.

* * * * *